United States Patent
Tang

(10) Patent No.: US 12,016,502 B2
(45) Date of Patent: Jun. 25, 2024

(54) CONTROL METHOD OF CLEANING ROBOT

(71) Applicant: ECOVACS ROBOTICS CO., LTD., Jiangsu (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 597 days.

(21) Appl. No.: 16/955,620

(22) PCT Filed: Oct. 29, 2018

(86) PCT No.: PCT/CN2018/112315
§ 371 (c)(1),
(2) Date: Jun. 18, 2020

(87) PCT Pub. No.: WO2019/128441
PCT Pub. Date: Jul. 4, 2019

(65) Prior Publication Data
US 2021/0000311 A1    Jan. 7, 2021

(30) Foreign Application Priority Data

Dec. 26, 2017  (CN) .......................... 201711437819.4

(51) Int. Cl.
*A47L 1/02* (2006.01)
*A47L 9/00* (2006.01)
*A47L 9/28* (2006.01)

(52) U.S. Cl.
CPC ................. *A47L 1/02* (2013.01); *A47L 9/009* (2013.01); *A47L 9/2836* (2013.01); *A47L 2201/06* (2013.01)

(58) Field of Classification Search
CPC ..... A47L 9/009; A47L 9/2836; A47L 2201/06
See application file for complete search history.

(56) References Cited

U.S. PATENT DOCUMENTS

| 6,010,199 | A  | 1/2000 | Hoffart |
| 6,267,453 | B1 | 7/2001 | Deland |

(Continued)

FOREIGN PATENT DOCUMENTS

| CN | 102641100 A | 8/2012 |
| CN | 102908109 A | 2/2013 |

(Continued)

OTHER PUBLICATIONS

Chinese Office Action dated Feb. 8, 2021 as received in application No. 20171147819.4.

(Continued)

*Primary Examiner* — Marc Carlson
(74) *Attorney, Agent, or Firm* — Maschoff Brennan

(57) ABSTRACT

A control method of a cleaning robot, where the cleaning robot includes a top part, a bottom part, and a vacuumizing assembly for air extraction, the bottom part of the cleaning robot is provided with at least two rows of driving wheels being respectively provided on both sides of the bottom part of the cleaning robot, and the cleaning robot includes a cleaning mode for cleaning the driving wheel; the method including: performing a cleaning mode of the cleaning robot; and after the cleaning robot performs the cleaning mode, turning off the vacuumizing assembly or maintaining the vacuumizing assembly in a turned off state, and starting and rotating at least one row of the driving wheels.

20 Claims, 4 Drawing Sheets

(56) References Cited

U.S. PATENT DOCUMENTS

| | | |
|---|---|---|
| 9,555,448 B2 | 1/2017 | Masia Perales |
| 9,763,551 B2 | 9/2017 | Murchie et al. |
| 2014/0312813 A1* | 10/2014 | Murchie .................. H02P 6/34 318/400.03 |
| 2016/0084243 A1 | 3/2016 | Feng |
| 2019/0202593 A1 | 7/2019 | Merzeau et al. |
| 2021/0000311 A1* | 1/2021 | Tang .................... A47L 9/2836 |

FOREIGN PATENT DOCUMENTS

| | | |
|---|---|---|
| CN | 104107012 A | 10/2014 |
| CN | 104207733 A | 12/2014 |
| CN | 204363895 U | 6/2015 |
| CN | 204562022 U | 8/2015 |
| CN | 204701681 U | 10/2015 |
| CN | 105054860 A | 11/2015 |
| CN | 105231950 A | 1/2016 |
| CN | 205234407 U | 5/2016 |
| CN | 105962858 A | 9/2016 |
| CN | 106073617 A | 11/2016 |
| CN | 106175568 A | 12/2016 |
| CN | 106182039 A | 12/2016 |
| CN | 106672096 A | 5/2017 |
| CN | 106901645 A | 6/2017 |
| CN | 206586906 U | 10/2017 |
| CN | 107380282 A | 11/2017 |
| CN | 107380282 A * | 11/2017 |
| CN | 109562858 A | 4/2019 |
| WO | 2008009024 A2 | 1/2008 |
| WO | 2008009024 A3 | 10/2008 |
| WO | 2012/072834 A1 | 6/2012 |

OTHER PUBLICATIONS

Chinese Office Action dated Sep. 27, 2022 as received in application No. 202111022534.0.

Chinese Office Action dated Jun. 10, 2023 as received in application No. 202111022534.0.

Chinese Office Action dated Apr. 1, 2022 as received in application No. 202111022534.0.

Chinese Office Action dated Feb. 8, 2021 as received in application No. 201711437819.4.

* cited by examiner

CONTROL METHOD OF CLEANING ROBOT

CROSS-REFERENCE TO RELATED APPLICATIONS

The present disclosure refers to Chinese Patent Application No. 201711437819.4, entitled "Control Method of Multi-medium Intelligent Cleaning Robot", filed on Dec. 26, 2017, which is incorporated herein by reference in its entirety.

TECHNICAL FIELD

The present disclosure relates to a control method of a cleaning robot, and in particular to a control method of a cleaning robot capable of working on various surfaces such as household windows, glass curtain walls and solar panels.

BACKGROUND

A cleaning robot for cleaning a smooth surface such as household windows, glass curtain walls or solar panels is usually absorbed on the smooth surface through a sucker, a track of which is then driven by wheels to travel on the smooth surface so as to remove dirt, dust and the like on the smooth surface through cleaning cloths and the like. Therefore, it is inevitable that the track is easily contaminated with dirt, which must be cleaned regularly. However, when the cleaning robot is shut down, the wheels and the track of the cleaning robot cannot rotate, resulting in incomplete cleaning. And after the cleaning robot is turned on, the sucker will start working at the same time. Although the wheels and the track are also rotating, it is impossible to clean the wheels and the track. Therefore, it is necessary to design a working mode in which the wheels are rotating but the sucker does not work.

SUMMARY

In order to solve one of the above problems, the present disclosure provides a control method of a cleaning robot capable of working on various surfaces such as household windows, glass curtain walls and solar panels, in particular to a control method of cleaning the track of the cleaning robot.

In order to realize the above-mentioned purpose, the technical solution provided by an embodiment of the present disclosure is as follows:

A control method of a cleaning robot, where the cleaning robot includes a top part, a bottom part and a vacuumizing assembly for air extraction, the bottom part of the cleaning robot is provided with at least two driving wheels being respectively provided on both sides of the bottom part of the cleaning robot, and the cleaning robot includes a cleaning mode for cleaning the driving wheel; the method including: performing a cleaning mode of the cleaning robot; and after the cleaning robot performs the cleaning mode, turning off the vacuumizing assembly or maintaining the vacuumizing assembly in a turned off state, and starting and rotating at least one of the two driving wheels.

As a further improvement of the present disclosure, the performing a cleaning mode of the cleaning robot includes: turning off the vacuumizing assembly and the driving wheel; acquiring an included angle $\Theta$ between the bottom part of the cleaning robot and a working plane, where the included angle $\Theta$ is an acute angle or a right angle; when $0<\Theta\leq90°$, performing the cleaning mode of the cleaning robot.

As a further improvement of the present disclosure, two driving wheels are provided, and the starting and rotating at least one of the two driving wheels includes: when $0<\Theta\leq30°$, rotating only one of the two driving wheels; when $30<\Theta\leq50°$, rotating both two driving wheels in one direction; when $50<\Theta\leq90°$, rotating both two driving wheels in a forward direction and in a backward direction alternately.

As a further improvement of the present disclosure, when $0<\Theta\leq30°$, if driving wheel alternation information is received, the driving wheel in a stopped state starts and rotates, and the driving wheel in a rotating state stops moving.

As a further improvement of the present disclosure, a period of the driving wheel rotating in the forward direction and a period of the driving wheel rotating in the backward direction are consistent.

As a further improvement of the present disclosure, the cleaning robot includes a cleaning unit for cleaning the driving wheel, and when $0<\Theta\leq90°$, performing the cleaning mode of the cleaning robot includes: turning on the cleaning unit to clean the driving wheel.

As a further improvement of the present disclosure, the cleaning unit is a water spraying device or a brush or a cleaning cloth.

As a further improvement of the present disclosure, the acquiring an included angle $\Theta$ between the bottom part of the cleaning robot and a working plane includes: acquiring the included angle $\Theta$ between the bottom part of the cleaning robot and the working plane through a sensor, where the sensor includes a gyroscope sensor, a geomagnetic sensor and an acceleration sensor.

As a further improvement of the present disclosure, the starting and rotating at least one of the two driving wheels includes: judging whether stop information or recovery information is received or not, and stopping rotation of the driving wheel after the stop information is received; restarting the driving wheel to rotate when the recovery information is received, where direction of rotation is consist with the direction before stopped.

As a further improvement of the present disclosure, the cleaning robot includes a glass wiping robot or a solar panel cleaning robot.

The present disclosure further provides a cleaning robot, including a top part, a bottom part, a vacuumizing assembly for air extraction, at least two driving wheels are respectively provided on both sides of the bottom part of the cleaning robot, a memory and a processor, where the cleaning robot includes a cleaning mode for cleaning the driving wheel; the memory stores one or more computer instructions, and the processer executes the one or more computer instructions to implement:

controlling the cleaning robot to perform the cleaning mode; and after the cleaning robot performs the cleaning mode, controlling the vacuumizing assembly to be turned off or to maintain the vacuumizing assembly in a turned off state, and controlling at least one of the two driving wheels to start and rotate.

The present disclosure further provides a computer-readable storage medium having stored a computer program thereon, when the computer program is executed by a computer, the control method of the cleaning robot of above is implemented.

The present disclosure has the beneficial effects as follows: by measuring the direction of the bottom part of the cleaning robot and the included angle $\Theta$ between the bottom part and a horizontal plane, the cleaning robot performs the cleaning mode, the vacuumizing assembly is turned off or maintained turned off, and the driving wheel rotates, so that the driving wheel can be cleaned through external cleaning or self-cleaning, which is convenient and efficient.

BRIEF DESCRIPTION OF THE DRAWINGS

The drawings described herein are used to provide a further understanding of the present application and constitute a part of the present application. The example embodiments of the present application and the descriptions thereof are used to explain the present application, and do not constitute an improper limitation on the present application. In the drawings.

DETAILED DESCRIPTION OF EXAMPLE EMBODIMENTS

Figure 1:
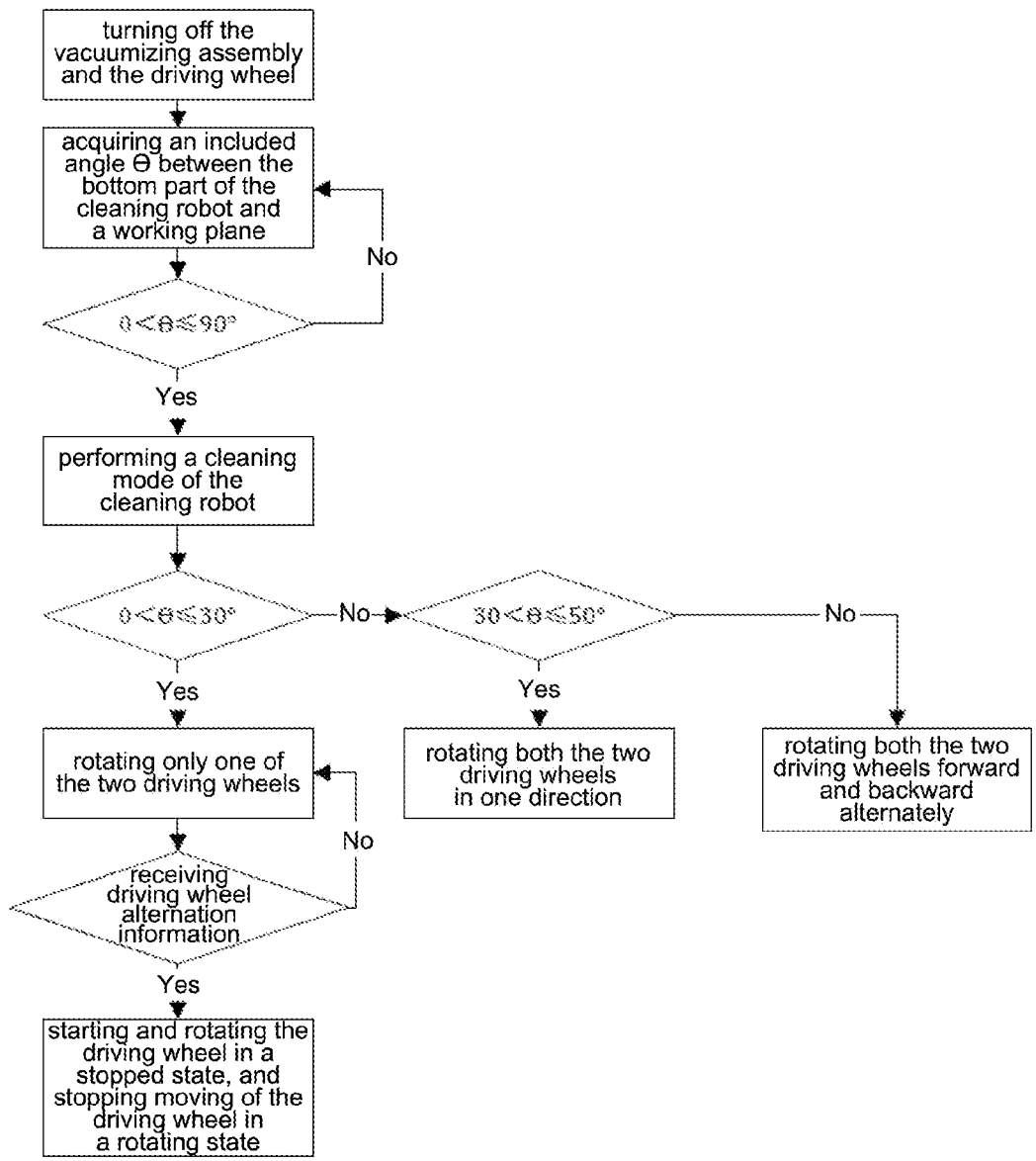
FIG. 1 is a flow chart of a control method of according to the present disclosure.

In order to make the purpose, technical solution and advantages of the present disclosure clearer, the present disclosure will be described in further detail below in conjunction with specific embodiments.

For making the purposes, technical solutions and advantages of the embodiments of the present invention clearer, the technical solutions in the embodiments of the present invention will be clearly and completely described below in combination with the drawings in the embodiments of the present invention. It is apparent that the described embodiments are not all embodiments but part of embodiments of the present invention. All other embodiments obtained by those of ordinary skill in the art on the basis of the embodiments in the present invention without creative work shall fall within the scope of protection of the present invention.

In the description of the present disclosure, it will be appreciated that the orientation or positional relationship indicated by the terms "longitudinal direction", "transverse direction", "up", "down", "front", "back", "left", "right", "vertical", "horizontal", "top", "bottom", "inside" and "outside" are based on the orientation or positional relationship shown in the drawings, and is only for the convenience of describing the present disclosure and simplifying the description, and not to indicate or imply that the robot or element referred to must have a specific orientation, be constructed and operate in a specific orientation, and therefore cannot be construed as the limitation to the present disclosure.

In the description of the present disclosure, unless otherwise specified and defined, it is to be understood that the terms "mounted", "coupled" and "connected" are to be interpreted broadly, for example, either mechanically or electrically, or in communication with the interiors of two elements, either directly or indirectly via an intermediate medium, as would be apparent to one of ordinary skill in the art that the specific meanings of the above terms may be understood as the case may be.

As shown in FIG. 1, the present disclosure discloses a control method of a cleaning robot. The cleaning robot includes a glass wiping robot or a solar panel cleaning robot. The cleaning robot may thus work on a variety of surfaces, such as glass curtain walls, household windows, solar panels, etc. The cleaning robot includes a top part and a bottom part, the bottom part is provided with at least two driving wheels being respectively provided on both sides of the bottom part of the cleaning robot. The cleaning robot further includes a vacuumizing assembly for air extraction. In addition, in the present embodiment, the driving wheel is arranged in two rows, and the rotating of the driving wheel drives the movement of a track. The present disclosure is mainly used to clean the dirt on the track.

The cleaning robot includes a cleaning mode for cleaning the driving wheel, and specifically the control method of the cleaning robot includes:

performing the cleaning mode of the cleaning robot; and after the cleaning robot performs the cleaning mode, turning off the vacuumizing assembly or maintaining the vacuumizing assembly in a turned off state, and starting and rotating at least one of the two driving wheels.

Therefore, after the cleaning robot performs the cleaning mode, the vacuumizing assembly does not work so as to facilitate the removal of the cleaning robot from an attached surface or prevent the operation of the cleaning robot from affecting cleaning. And then at least one of the two driving wheels is started to rotate, so that the driving wheel may be cleaned through an external cleaning device or an internal cleaning device.

The performing the cleaning mode of the cleaning robot further includes:

closing the vacuumizing assembly and the driving wheel;

acquiring an included angle Θ between the bottom part of the cleaning robot and a working plane, wherein the included angle Θ is an acute angle or a right angle;

when $0<\Theta\leq 90°$, performing a cleaning mode of the cleaning robot.

It is difficult to lift the cleaning robot from a working plane due to the fact that the cleaning robot keeps an adsorption state with the working plane under the working state of the vacuumizing assembly. Thus, during the performing of the cleaning mode, the vacuumizing assembly and the driving wheel must first be turned off. After the included angle Θ between the bottom part of the cleaning robot and the working plane is acquired, if Θ=0, it indicates that the cleaning robot is still attached to the surface of the working plane, and if $0<\Theta\leq 90°$, it indicates that the cleaning robot has been lifted so as to judge that the cleaning robot is in the cleaning mode. It should be noted that the included angle Θ between the bottom part of the cleaning robot and the working plane must have two opposite angles, and only an acute angle or a right angle is taken in the present disclosure to prevent ambiguity. Furthermore, the working plane refers to the surface on which the cleaning robot operates.

Specifically, the starting and rotating at least one of the two driving wheels specifically includes:

when $0<\Theta\leq 30°$, rotating only one of the two driving wheels;

when $30<\Theta\leq 50°$, rotating both two driving wheels in one direction;

when $50<\Theta\leq 90°$, rotating both two driving wheels a forward direction and in a backward direction alternately.

Furthermore, when $0<\Theta\leq 30°$, if driving wheel alternation information is received, the driving wheel in a stopped state starts and rotates, and the driving wheel in a rotating state stops moving. That is, when $0<\Theta\leq 30°$, only one of the two driving wheels is rotating, in order to change to the state that the other driving wheel is rotating, the driving wheel alternation information may be sent to the cleaning robot.

Furthermore, if both two driving wheels are required to rotate in the forward direction or rotate in the backward direction alternately, the period of the driving wheel rotating in the forward direction and the period in the backward direction are consistent.

The starting and rotating at least one of the two driving wheels specifically includes: judging whether stop information or recovery information is received or not, and stopping rotation of the driving wheel after the stop information is received; restarting the driving wheel to rotate when the recovery information is received, the direction of rotation is consist with the direction before stopped. When there is dirt that is difficult to clean during the rotation of the driving wheel, the driving wheel can be stopped rotating by sending stop information to the cleaning robot, so as to carefully clean the dirt exposed outside the driving wheel. After the cleaning, recovery information may be sent to the cleaning robot, so that the driving wheel restarts to rotate, and the direction of rotation is consistent with the direction before stopping.

Further, in the present embodiment, the driving wheel may be cleaned by external cleaning or self-cleaning. Specifically, the external cleaning process may be performed by manually scrubbing the driving wheel with a cleaning cloth or the like during the rotation of the driving wheel. During self-cleaning, the cleaning robot includes a cleaning unit for cleaning the driving wheel, and when $0<\Theta\leq 90°$, performing the cleaning mode of the cleaning robot specifically includes:

turning on the cleaning unit to clean the driving wheel. In the present embodiment, the cleaning unit is a water spraying device or a brush or a cleaning cloth or the like, the water spraying device, the brush or the cleaning cloth or the like is provided inside the cleaning robot, and after performing the cleaning mode, the cleaning unit starts to work and actively clean the driving wheel.

Furthermore, the acquiring an included angle $\Theta$ between the bottom part of the cleaning robot and a working plane includes: acquiring the included angle $\Theta$ between the bottom part of the cleaning robot and a working plane through a sensor. The sensor includes a gyroscope sensor, a geomagnetic sensor and an acceleration sensor. Of course, if other sensors may sense the included angle $\Theta$, the purpose of the present disclosure may also be achieved.

Specifically, the gyroscope sensor is preferably adopted in the present disclosure, and the gyroscope sensor is an angular motion detection robot which uses a moment of momentum sensitive shell of a high-speed revolving body to rotate relative to an inertial space around one or two axes orthogonal to a rotation axis. Of course, an angular motion detection robot made using other principles to perform the same function may also be referred to as a gyroscope sensor. The gyroscope sensor is a simple and easy-to-use positioning and control robot based on free space and gestures, which can accurately detect directions and angles.

In particular, the various working scenarios presented below further illustrate the benefits of the present disclosure. When the cleaning robot performs cleaning on the glass, the cleaning robot is usually absorbed on the smooth surface through a sucker, a track of which is driven by driving wheel to travel on the smooth surface. If the cleaning is started without checking the driving wheel and the track in advance, there will be dirt and dust on the driving wheel, causing problems such as incomplete cleaning during cleaning. When the problems occur, the cleaning mode may be started to clean the driving wheel as needed. In the above process, even if there is dirt on one of the two driving wheels, the cleaning robot may be rotated by 0-30° to clean one of the two driving wheels, so that the efficiency of the cleaning robot in the cleaning process is guaranteed.

And secondly, the driving wheel drives the track to travel on the smooth surface. It is inevitably that the track is easily contaminated with dirt, which must be cleaned regularly. However, when the cleaning robot is shut down, the driving wheel and the track of the cleaning robot cannot rotate, resulting in incomplete cleaning. And after the cleaning robot is turned on, the sucker will start working at the same time, and although the driving wheel and the track are also rotating, it is impossible to clean the driving wheel and the track. When the problem occurs, the cleaning mode may also be started to clean the driving wheel as needed. So that the situations of incomplete cleaning and the need to manually clean the driving wheel are avoided, and the cleaning robot is faster and more user-friendly in using.

In summary, in the control method of the cleaning robot according to the present disclosure, the cleaning robot is firstly judged to perform the cleaning mode, after the cleaning robot performs the cleaning mode, the vacuumizing assembly is turned off or maintained in a turned off state to prevent its working from affecting the driving wheel, and at least one of the two driving wheels are started and rotating, thereby facilitating the cleaning of the driving wheel.

Figure 2:
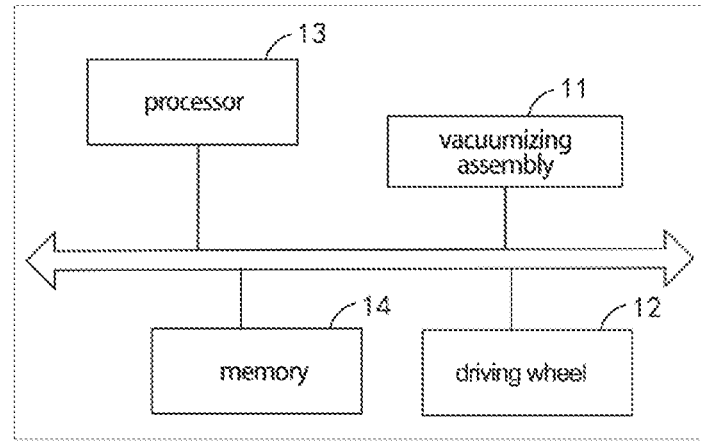
FIG. 2 is a structural composition schematic diagram of a cleaning robot according to the present disclosure.
Figure 3:
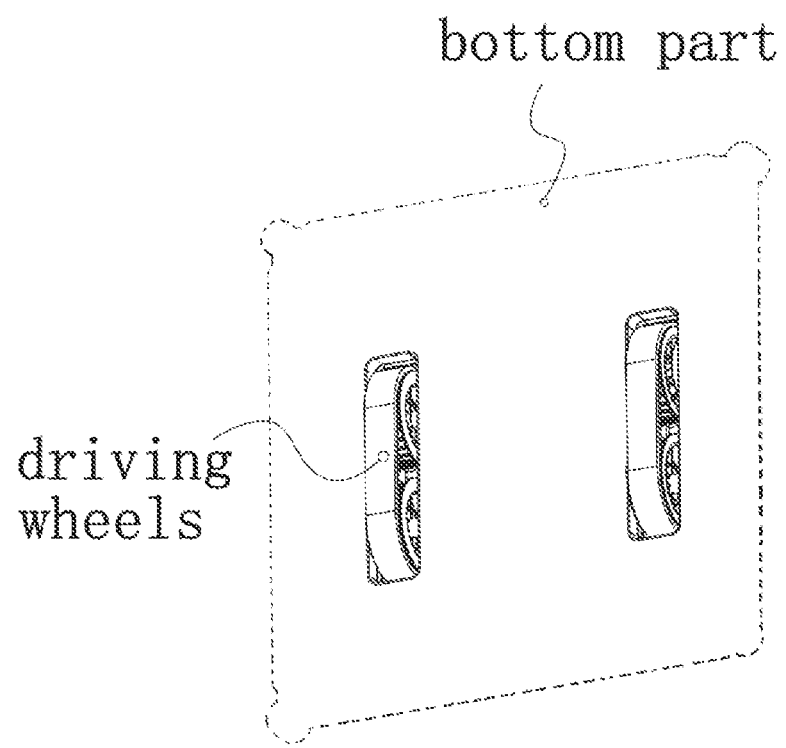
FIG. 3 is a schematic diagram of a cleaning robot according to the present disclosure.
Figure 4:
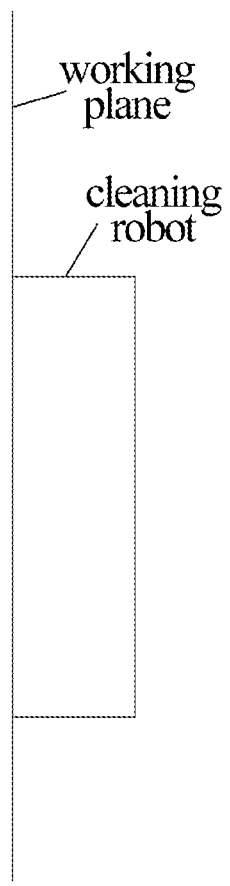
FIG. 4 is a schematic diagram illustrating a cleaning robot being adsorbed on a working plane according to the present disclosure.
Figure 5:
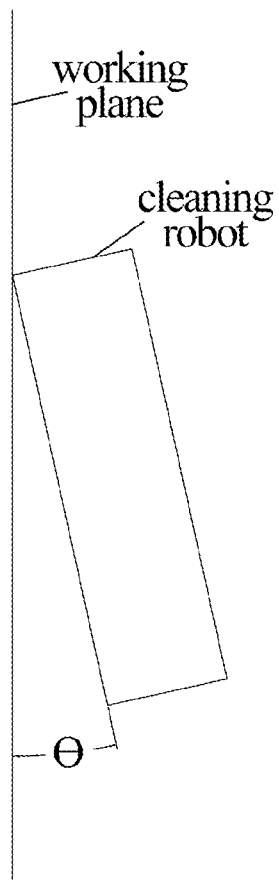
FIG. 5 is a schematic diagram illustrating a cleaning robot being lifted with an included angle Θ according to the present disclosure.

In one possible design, the cleaning robot includes a top part, a bottom part, and a vacuumizing assembly 11 for air extraction. The bottom part of the cleaning robot is provided with at least two driving wheels 12 being respectively provided on both sides of the bottom part of the cleaning robot. The cleaning robot includes a cleaning mode for cleaning the driving wheel. As shown in FIG. 2, the cleaning robot further includes a processor 13 and a memory 14. The memory 14 stores a program supporting the cleaning robot to execute the control method according to the above embodiments, and the processor 13 executes the program stored in the memory 14.

The program includes one or more computer instructions. The one or more computer instructions are executed by the processor 13 to implement the following steps:

controlling the cleaning robot to perform a cleaning mode; and after the cleaning robot performs the cleaning mode, controlling the vacuumizing assembly to be turned off or maintaining the vacuumizing assembly in a turned off state, and controlling at least one of the two driving wheels to start and rotate.

Optionally, the processor 13 further executes all or part of the steps in the foregoing embodiments.

In addition, the embodiment of the present disclosure provides a computer storage medium for storing computer software instructions for the cleaning robot, which includes the program involved in executing the control method of the cleaning robot in the foregoing embodiments.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may implement information storage by any method or technology. The information may be a computer-readable instruction, a data structure, a program module, or other data.

Examples of storage media of the cleaning robot include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by the cleansing robot.

It will be appreciated that although this specification is described according to the embodiments, not each embodiment only includes one independent technical solution, and this narration mode of the specification is only for the sake of clarity, and those skilled in the art should take the specification as a whole, and the technical solutions in each embodiment can also be combined as appropriate to make other embodiments appreciated by those skilled in the art.

The foregoing detailed description is only specific description of the feasible embodiments of the present disclosure, and is not intended to limit the protection scope of the present disclosure. Any equivalent embodiment or modification made without departing from the technical spirit of the present disclosure should be included in the protection scope of the present disclosure.

What is claimed is:

1. A control method of a cleaning robot, wherein the cleaning robot comprises a top part, a bottom part and a vacuumizing assembly for air extraction, the bottom part of the cleaning robot is provided with at least two driving wheels being respectively provided on both sides of the bottom part of the cleaning robot, and the cleaning robot comprises a cleaning mode for cleaning the driving wheel; wherein the vacuumizing assembly makes the cleaning robot to be adsorbed on a working plane when the vacuumizing assembly works;
the method comprising:
receiving a command from a user to begin a cleaning mode for cleaning the driving wheel;
turning off the vacuumizing assembly to enable the cleaning robot to be lifted; and
maintaining the vacuumizing assembly in a turned off state after the cleaning robot being lifted, and starting and rotating at least one of the two driving wheels for cleaning.

2. The control method of the cleaning robot according to claim 1, wherein before starting and rotating at least one of the two driving wheels comprises:
acquiring an included angle $\Theta$ between the bottom part of the cleaning robot and the working plane, wherein the included angle $\Theta$ is an acute angle or a right angle;
when $0<\Theta\leq90°$, starting and rotating at least one of the two driving wheels while maintaining the vacuumizing assembly in a turned off state.

3. The control method of the cleaning robot according to claim 2, wherein two driving wheels are provided, and the starting and rotating at least one of the two driving wheels comprises:

when $0<\Theta\leq30°$, rotating only one of the two driving wheels;
when $30<\Theta\leq50°$, rotating both two driving wheels in one direction;
when $50<\Theta\leq90°$, rotating both two driving wheels in a forward direction and in a backward direction alternately.

4. The control method of the cleaning robot according to claim 3, wherein when $0<\Theta\leq30°$, if driving wheel alternation information is received, the driving wheel in a stopped state starts and rotates, and the driving wheel in a rotating state stops moving.

5. The control method of the cleaning robot according to claim 3, wherein a period of the driving wheel rotating in the forward direction and a period of the driving wheel rotating in the backward direction are consistent.

6. The control method of the cleaning robot according to claim 3, wherein the cleaning robot comprises a cleaning unit for cleaning the driving wheel, and when $0<\Theta\leq90°$, turning on the cleaning unit to clean the driving wheel.

7. The control method of the cleaning robot according to claim 6, wherein the cleaning unit is a water spraying device or a brush or a cleaning cloth.

8. The control method of the cleaning robot according to claim 2, wherein the acquiring an included angle $\Theta$ between the bottom part of the cleaning robot and a working plane comprises:
acquiring the included angle $\Theta$ between the bottom part of the cleaning robot and the working plane through a sensor, wherein the sensor comprises at least one of: a gyroscope sensor, a geomagnetic sensor and an acceleration sensor.

9. The control method of the cleaning robot according to claim 1, wherein the starting and rotating at least one of the two driving wheels comprises: judging whether stop information or recovery information is received or not, and stopping rotation of the driving wheel after the stop information is received; restarting the driving wheel to rotate when the recovery information is received, wherein direction of rotation is in consistence with the direction before stopped.

10. The control method of the cleaning robot according to claim 1, wherein the cleaning robot comprises at least one of: a glass wiping robot and a solar panel cleaning robot.

11. A computer-readable storage medium having stored a computer program thereon, when the computer program is executed by a computer, the control method of the cleaning robot according to claim 1 is implemented.

12. A cleaning robot, comprising a top part, a bottom part, a vacuumizing assembly for air extraction, at least two driving wheels are respectively provided on both sides of the bottom part of the cleaning robot, a memory and a processor, wherein the cleaning robot comprises a cleaning mode for cleaning the driving wheel; wherein the vacuumizing assembly makes the cleaning robot to be adsorbed on a working plane when the vacuumizing assembly works; the memory stores one or more computer instructions, and the processor executes the one or more computer instructions to implement:
receiving a command from a user to begin the cleaning mode for cleaning the driving wheel;
turning off the vacuumizing assembly to enable the cleaning robot to be lifted; and
maintaining the vacuumizing assembly in a turned off state after the cleaning robot being lifted, and controlling at least one of the two driving wheels to start and rotate for cleaning.

13. The cleaning robot according to claim 12, wherein before starting and rotating at least one of the two driving wheels comprises:
acquiring an included angle Θ between the bottom part of the cleaning robot and the working plane, wherein the included angle Θ is an acute angle or a right angle;
when 0<Θ≤90°, starting and rotating at least one of the two driving wheels while maintaining the vacuumizing assembly in a turned off state.

14. The cleaning robot according to claim 13, wherein the controlling at least one of the two driving wheels to start and rotate comprises:
when 0<Θ≤30°, rotating only one of the two driving wheels;
when 30<Θ≤50°, rotating both two driving wheels in one direction;
when 50<Θ≤90°, rotating both two driving wheels in a forward direction and in a backward direction alternately.

15. The cleaning robot according to claim 14, wherein when 0<Θ≤30°, if driving wheel alternation information is received, the driving wheel in a stopped state starts and rotates, and the driving wheel in a rotating state stops moving.

16. The cleaning robot according to claim 13, wherein the acquiring an included angle Θ between the bottom part of the cleaning robot and a working plane comprises:
acquiring the included angle Θ between the bottom part of the cleaning robot and the working plane through a sensor, wherein the sensor comprises at least one of: a gyroscope sensor, a geomagnetic sensor and an acceleration sensor.

17. The cleaning robot according to claim 12, wherein a period of the driving wheel rotating in the forward direction and a period of the driving wheel rotating in the backward direction are consistent.

18. The cleaning robot according to claim 17, wherein the cleaning unit is a water spraying device or a brush or a cleaning cloth.

19. The cleaning robot according to claim 12, wherein the cleaning robot comprises a cleaning unit for cleaning the driving wheel, and when 0<Θ≤90°, turning on the cleaning unit to clean the driving wheel.

20. The cleaning robot according to claim 12, wherein the starting and rotating at least one of the two driving wheels comprises: judging whether stop information or recovery information is received or not, and stopping rotation of the driving wheel after the stop information is received; restarting the driving wheel to rotate when the recovery information is received, wherein direction of rotation is in consistence with the direction before stopped.

* * * * *